United States Patent
Li et al.

(10) Patent No.: US 12,547,650 B2
(45) Date of Patent: Feb. 10, 2026

(54) HUMAN-MACHINE CONVERSATION METHOD AND APPARATUS, DEVICE, AND STORAGE MEDIUM

(71) Applicant: ALIBABA DAMO (HANGZHOU) TECHNOLOGY CO., LTD., Hangzhou (CN)

(72) Inventors: Yongbin Li, Beijing (CN); Binhua Li, Beijing (CN); Xiang Shi, Hangzhou (CN); Ruiying Geng, Beijing (CN); Binyuan Hui, Beijing (CN); Jian Sun, Beijing (CN)

(73) Assignee: ALIBABA DAMO (HANGZHOU) TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/691,796

(22) PCT Filed: Aug. 3, 2022

(86) PCT No.: PCT/CN2022/109990
§ 371 (c)(1),
(2) Date: Mar. 13, 2024

(87) PCT Pub. No.: WO2023/051021
PCT Pub. Date: Apr. 6, 2023

(65) Prior Publication Data
US 2024/0394287 A1   Nov. 28, 2024

(30) Foreign Application Priority Data
Sep. 30, 2021  (CN) .......................... 202111165469.7

(51) Int. Cl.
*G06F 16/00*   (2019.01)
*G06F 16/3329*   (2025.01)
(Continued)

(52) U.S. Cl.
CPC ...... *G06F 16/3329* (2019.01); *G06F 16/3332* (2019.01); *G06F 16/3344* (2019.01)

(58) Field of Classification Search
CPC ............ G06F 16/3329; G06F 16/3332; G06F 16/3344
(Continued)

(56) References Cited

U.S. PATENT DOCUMENTS

| 2004/0162838 | A1* | 8/2004 | Murayama | ............ G06F 16/289 |
| 2016/0012052 | A1* | 1/2016 | Zoryn | ............... G06F 16/24578 |
| | | | | 707/728 |

(Continued)

FOREIGN PATENT DOCUMENTS

| CN | 101706792 A | * | 5/2010 |
| CN | 108241649 | | 7/2018 |

(Continued)

OTHER PUBLICATIONS

Office Action and Search Report for Chinese Patent Application No. 202111165469.7 mailed Dec. 13, 2024 with English Translation (18 pages).

(Continued)

*Primary Examiner* — Monica M Pyo
(74) *Attorney, Agent, or Firm* — The Sun IP Law

(57) ABSTRACT

A human-machine conversation method and apparatus, a device, and a storage medium. The method comprises: acquiring a user statement of a current round; determining, from one or more candidate tables, one or more target tables that match the user statement; parsing the user statement of the current round to obtain a first query statement; according to the first query statement, querying from the one or more target tables to obtain target data; and generating a system reply of the current round according to the target data.

7 Claims, 7 Drawing Sheets

(51) Int. Cl.
  *G06F 16/3332* (2025.01)
  *G06F 16/334* (2025.01)
(58) Field of Classification Search
  USPC .......................................................... 707/760
  See application file for complete search history.

(56) References Cited

U.S. PATENT DOCUMENTS

2021/0191962 A1* 6/2021 Qu .................... G06F 16/243
2021/0209163 A1* 7/2021 Boxwell ................ G06F 40/30

FOREIGN PATENT DOCUMENTS

| CN | 111428027 | | 7/2020 |
| CN | 111459977 | A | 7/2020 |
| CN | 111625635 | | 9/2020 |
| CN | 111984766 | | 11/2020 |
| CN | 112069206 | | 12/2020 |
| CN | 112527998 | | 3/2021 |
| CN | 113254619 | | 8/2021 |
| CN | 113254619 | A * | 8/2021 |
| CN | 114186016 | | 3/2022 |
| WO | 2017010652 | | 1/2017 |

OTHER PUBLICATIONS

English Translation of International Search Report mailed Oct. 27, 2022 for International PCT Patent Application No. PCT/CN2022/109990 (3 pages).
The first search report of the priority CN patent application No. 202111165469.7, mail date Aug. 5, 2024.
The supplementary search report of the priority CN patent application No. 202111165469.7, mail date Dec. 13, 2024.
Li, Zhi et al. "Research and Prospect of Automatic Question Answer Based on Table", Computer Engineering and Applications, Apr. 28, 2021, 57 (13).

* cited by examiner

HUMAN-MACHINE CONVERSATION METHOD AND APPARATUS, DEVICE, AND STORAGE MEDIUM

CROSS-REFERENCE TO RELATED APPLICATIONS

This application is a U.S. National Phase Application of PCT International Application No. PCT/CN2022/109990, filed Aug. 3, 2022, which claims the priority of Chinese Patent Application No. 202111165469.7, entitled "HUMAN-MACHINE CONVERSATION METHOD AND APPARATUS, DEVICE, AND STORAGE MEDIUM", filed with the China Patent Office on Sep. 30, 2021, which is incorporated in the present disclosure by reference in its entirety.

TECHNICAL FIELD

The present disclosure relates to a field of information technology and, in particular to a human-computer dialogue (human-machine conversation) method, apparatus, device, and storage medium.

BACKGROUND

With the continuous development of science and technology, human-computer conversation has become increasingly common.

However, the inventors of the present application found that tabular knowledge is the most widely existing structured knowledge in the world, such as tables in daily office work, various tables on web pages, and structured query languages (SQL) databases existing in most enterprises and organizations. As such, how to enable a user to acquire the content in tabular knowledge in the form of human-computer dialogue has become a problem that needs to be solved urgently in the existing technology.

SUMMARY

In a first aspect, an embodiment of the present disclosure provides a human-computer dialogue method, which includes:
  acquiring a user statement for a current round;
  determining, from one or more candidate tables, one or more target tables that match the user statement;
  parsing the user statement for the current round to obtain a first query statement;
  querying from the one or more target tables according to the first query statement to obtain target data; and
  generating a system reply for the current round according to the target data.

In a second aspect, an embodiment of the present disclosure provides a human-computer dialogue apparatus, which includes:
  an acquisition module configured for acquiring a user statement for a current round;
  a determination module configured for determining, from one or more candidate tables, one or more target tables that match the user statement;
  a parse module configured for parsing the user statement for the current round to obtain a first query statement;
  a query module configured for querying from the one or more target tables according to the first query statement to obtain target data; and
  a generation module configured for generating a system reply for the current round according to the target data.

In a third aspect, an embodiment of the present disclosure provides an electronic device, which includes:
  a memory;
  a processor; and
  a computer program;
  wherein the computer program is stored in the memory and configured to be executed by the processor to implement the method according to the first aspect.

In a fourth aspect, an embodiment of the present disclosure provides a computer-readable storage medium, on which a computer program is stored, wherein the computer program, when executed by a processor, implements the method according to the first aspect.

In a fifth aspect, an embodiment of the present disclosure provides a computer program product, which includes a computer program, wherein the computer program, when executed by a processor, implements the method according to the first aspect.

BRIEF DESCRIPTION OF THE DRAWINGS

The accompanying drawings, which are incorporated in and constitute a part of this specification, illustrate embodiments consistent with the present disclosure, and together with the specification, serve to explain the principles of the present disclosure.

In order to specify the technical solutions in the embodiments of the present disclosure or the existing technology more clearly, the drawings needed in the description of the embodiments or the existing technology will be briefly introduced below. Obviously, for those of ordinary skill in the art, other drawings may be obtained according to these drawings without involving any inventive efforts.

DETAILED DESCRIPTION

In order to understand the above purpose, features and advantages of the present disclosure more clearly, the scheme of the present disclosure will be further described below. It should be noted that the embodiments of the present disclosure and the features in the embodiments may be combined with each other without conflict.

In the following description, many specific details are set forth in order to fully understand the present disclosure. However, the present disclosure may also be implemented in other ways than those described herein. Obviously, the embodiments in the specification are only some of the embodiments of the present disclosure, not all of them.

Generally, a human-computer dialogue is based on knowledge, which includes process knowledge, atlas knowledge, and documents. However, with the continuous development of tabular knowledge, at present, two-dimensional tabular knowledge is widely available structured knowledge in the world, such as tables in daily office work, various tables in web pages, SQL databases existing in most enterprises and organizations, etc. Moreover, the tabular knowledge is clear in structure, easy to maintain and time-sensitive. As such, how to make people interact with the tabular knowledge in the way of natural language dialogue is a hot technical direction of common concern in industry and academia, and it is also one of the frontier directions of artificial intelligence research.

In order to solve the above technical problem or at least partially solve the above technical problem, the present disclosure provides a human-computer dialogue method, apparatus, device, and storage medium, achieving the purpose of enabling a user to acquire tabular knowledge by way of human-computer dialogue. Embodiments of the present disclosure provide a human-computer dialogue method based on tabular knowledge, which will be introduced below with specific embodiments.

Figure 1:
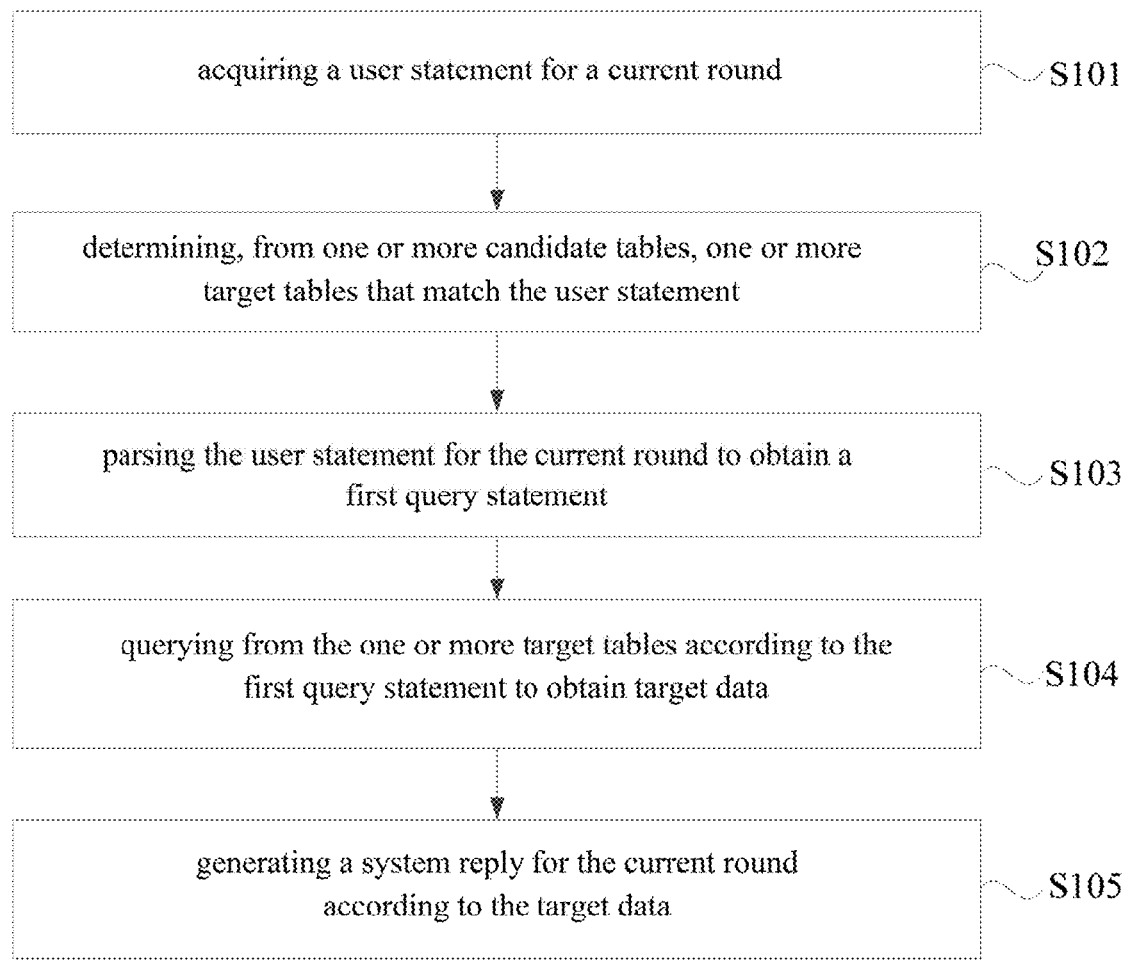
FIG. 1 is a flowchart of a human-computer dialogue method provided by an embodiment of the present disclosure.

FIG. 1 is a flowchart of a human-computer dialogue method provided by an embodiment of the present disclosure. This embodiment may be applied to the case of making a human-computer dialogue in a client, and the method may be executed by a human-computer dialogue apparatus, which may be implemented using software and/or hardware and may be configured in an electronic device such as a terminal, specifically including a mobile phone, a computer, or a tablet computer. Alternatively, this embodiment may be applied to the case of making a human-computer dialogue in a server, and the method may be executed by a human-computer dialogue apparatus, which may be implemented using software and/or hardware and may be configured in an electronic device such as a server.

In addition, the human-computer dialogue method as described in this embodiment may be applied to various scenarios, for example, a user makes a human-computer dialogue with a terminal, which may be a user device such as a robot, a mobile phone, a computer, etc. In a scenario where a user makes a dialogue with a robot, the user may have a face-to-face dialogue with the robot at the same location, or the user may have a remote dialogue with the robot at different locations. The way in which a user makes a dialogue with a terminal is not limited to through voice, but also through text, gestures, etc. After receiving the user's question (that is, a user statement), the terminal needs to give a corresponding reply according to the question, which is called a system reply in the embodiment of the present disclosure.

Figure 2:
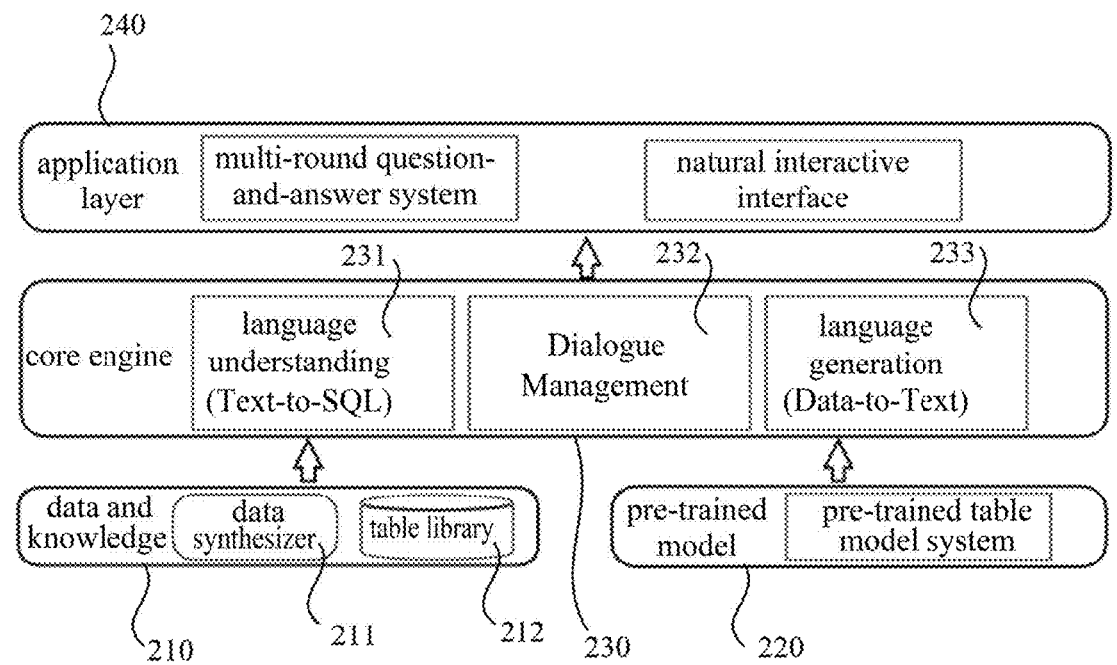
FIG. 2 is a schematic structural diagram of a human-computer dialogue interaction system based on tabular knowledge provided by an embodiment of the present disclosure.

Referring to the structural schematic diagram of a human-computer dialogue interactive system based on tabular knowledge as shown in FIG. 2, the human-computer dialogue interactive system includes four parts, namely, a data and knowledge part 210, a pre-trained model part 220, a core engine part 230 and an application layer part 240.

The data and knowledge part 210 includes a data synthesizer 211 and a tabular knowledge library table 212. Stored in the tabular knowledge library table 212 is some type of tabular data, such as tabular data about vehicles, tabular data about a certain business handling process, etc. The specific type of tabular data may be determined according to the application scenario. For example, if the application scenario is an intelligent customer service system on an automobile platform, the type of tabular data may be vehicle-related, and the tabular data may be about vehicles. The function of the data synthesizer 211 is to automatically synthesize <Text, SQL> data pairs, that is, to automatically synthesize a query statement in SQL corresponding to a natural language statement in Text. The large number of generated data pairs are used as training data sets of a language understanding apparatus 231 in the core engine part 230, which will be further specified later.

The pre-trained model part 220: in the field of natural language processing, the emergence of pre-trained language models is a major breakthrough, which brings universal and significant effect improvement to downstream tasks. In the technical solution of the present disclosure, the pre-trained model adopts the form of a pre-trained table model for tabular knowledge, which specifically includes a pre-trained table understanding model, a pre-trained table generation model, etc.

The core engine part 230 includes a language understanding apparatus 231, a dialogue management apparatus 232 and a language generation apparatus 233.

The main function of the language understanding apparatus 231 is to provide a way of language understanding. i.e., Text-to-SQL, which parses the question in Text input by the user in a natural language into a query statement in SQL that may be recognized by a machine, and records the query statement in SQL as a first query statement. Optionally, the process of parsing, by the language understanding apparatus 231, the user's question in Text into the first query statement is as follows: after receiving the user's current question, the language understanding apparatus 231 selects one or more tables satisfying the current question from candidate tables, and records the selected one or more tables satisfying the current question as target tables: the target tables and the current question together being taken as inputs for a Text-to-SQL model, and the SQL statement output by the Text-to-SQL model being the first query statement corresponding to the current question. After obtaining the first query statement, the language understanding apparatus 231 further provides the first query statement to the dialogue management apparatus 232, or the dialogue management apparatus 232 may proactively request the first query statement from the language understanding apparatus 231.

The main function of the dialogue management apparatus 232 is to provide a way of language synthesis, i.e., SQL-to-Text, to convert a SQL statement into a natural language statement in Text, to manage the dialogue states of multiple rounds of dialogue, to provide a SQL statement according to the dialogue state, to record the SQL statement as a second query statement, to further query relevant tabular data from the above-mentioned target tables according to the second query statement, and to record the relevant tabular data queried as a query result. Optionally, the query result is provided to the language generation apparatus 233, or the language generation apparatus 233 proactively requests the query result from the dialogue management apparatus 232. What needs to be particularly specified that the second query statement is different from the first query statement obtained by the language understanding apparatus 231. Specifically, after acquiring the first query statement, the dialogue management apparatus 232 modifies the first query statement according to at least one of the three factors described below to obtain the second query statement corresponding to the current question: the three factors are specifically as follows: the modified SQL statement corresponding to the user historical question in the previous round of dialogue before the user's current question (that is, the second query statement in the previous round of dialogue), the conversation action corresponding to the current question and the system state corresponding to the previous round of dialogue. "The modified SQL statement corresponding to the user historical question in the previous round of dialogue before the user's current question" is stored in the "context" database shown in FIG. 4. "The conversation action corresponding to the current question" is obtained by the dialogue management apparatus 232 according to the second query statement in the previous round of dialogue and the first query statement in the current round of dialogue. "The system state corresponding to the previous dialogue" refers to whether the system directly replied to the dialogue with a script or asked the user a question in the previous round of dialogue. "The system state corresponding to the previous round of dialogue" is also stored in the "context" database shown in FIG. 4. A question from a user and a reply given by the system to the question serve as a round of dialogue. "Conversation actions" include adding a query condition, deleting a query condition and modifying a query condition. Specifically, an example of adding a query condition is as follows: the user inputs a first question: "what are the wealth management products with a yield of more than 3.5%?", and after the system replies to the first question, the user then inputs a second question: "what about the wealth management products with guaranteed capital". In this scenario, the second question input by the user actually involves adding a query condition on the basis of the first question, that is, the complete information corresponding to the second question is "what are the wealth management products with a yield of more than 3.5% and guaranteed capital", that is, adding the query condition "with guaranteed capital" on the basis of the query condition "with a yield of more than 3.5%". An example of deleting a query condition is as follows: the user inputs a first question: "what are the wealth management products with guaranteed capital and a yield of more than 3.5%?", after the system replies to the first question, the user inputs a second question: "what about the wealth management products with a yield of more than 3.5%". In this scenario, the user's second question actually involves deleting a query condition on the basis of the first question, that is, the complete information corresponding to the second question is "what are the wealth management products with a yield of more than 3.5%". An example of modifying a query condition is as follows: the user inputs a first question: "does the car of a certain brand have a skylight". After the system replies to the first question, the user enters a second question, "what is the performance of the off-road vehicle of the certain brand". In this scenario, the query condition corresponding to the user's second question is different from the query condition corresponding to the first question, and it is a scenario of modifying query conditions. The process of modifying the first query statement to obtain the second query statement corresponding to the current question is further exemplified as follows.

The user asks: does a car of Sun brand have a skylight? (This question is a historical question).

The system replies: the car of Sun brand has a skylight. (One question asked by the user and a targeted reply given by the system constitute a round of dialogue).

The user further asks: what about its acceleration of 100 kilometers? (This question is a current question).

The SQL statement corresponding to the question "does a car of Sun brand have a skylight?" is, for example, "SELECT skylight WHERE car of Sun brand". The SQL statement (that is, the first query statement) corresponding to the question "what about its acceleration of 100 kilometers?" is "SELECT acceleration of 100 kilometers". The second query statement obtained after modifying the first query statement is "SELECT acceleration of 100 kilometers WHERE car of Sun brand". Further, the dialogue management apparatus 232 performs data query in the target tables according to the second query statement, records the queried data as a query result, and provides the query result to the language generation apparatus 233.

The main function of the language generation apparatus 233 is to provide a way of language generation, i.e., Data-to-Text, to convert table data in Data into a natural language statement in Text, specifically, generating a reply script according to the user's current question, the second query statement and the query result, and specifically, giving a targeted reply to the current question from the user in a natural language. For example, if the user's current question is whether the car of a certain brand have a skylight and the query result is Y, where Y represents the presence of a skylight, the reply script generated will be that the car of a certain brand has a skylight.

The application layer part 240: the human-computer dialogue interactive system based on tabular knowledge has many applications, classic examples of which are a multi-round question-and-answer system for dialogue robot and a natural interactive interface for SQL database. The application scenarios of the multi-round question and answer system for dialogue robot are, for example, a dialogue between a human and a robot, a face-to-face dialogue between a human and a robot at the same location, or a remote dialogue between a human and a robot at different locations. The application scenario of the natural interactive interface for SQL database is, for example, that a user inputs a question in a browser or a user interface, and a terminal sends the question to a remote server, within which a SQL database is integrated, or which communicates with the SQL database. Further, the remote server queries the data from the tables stored in the SQL database according to the user question, and sends the data to the terminal, which generates natural language according to the data and gives a reply to the user.

In order to fully disclose the technical solution of this embodiment, the key parts of the human-computer dialogue interaction system based on tabular knowledge shown in FIG. 2 are further specified.

Specifically, the human-computer dialogue interaction system based on tabular knowledge completes the interaction between the system and the user, and its core function is how to convert a question (namely, the user question in Text) input by the user using natural language into an SQL expression (namely, a SQL query statement that may be recognized by a machine). The realization of this core function depends on the Text-to-SQL model, namely, the language understanding apparatus 231 in the core engine part 230.

Figure 3:
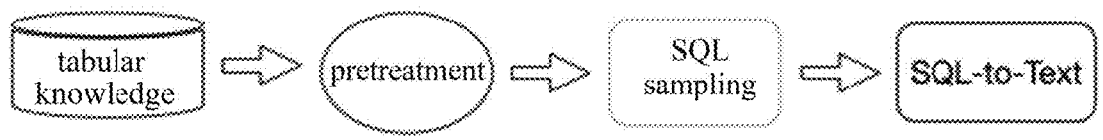
FIG. 3 is a schematic diagram of the process of automatically generating training data provided an embodiment of the present disclosure.

A large number of <Text, SQL> data pairs are required as training data to train the Text-to-SQL model, but it is difficult and costly to obtain training data through manual annotation. To solve this problem, the present disclosure proposes a data synthesizer 211 for automatically generating training data. When tabular knowledge is given, the training data is automatically generated through the data synthesizer 211, and the process of automatically generating the training data by the data synthesizer 211 is shown in FIG. 3.

Specifically, tabular knowledge is given, which refers to the data stored in a tabular form. Firstly, preprocessing is performed on the tabular knowledge, which includes normalization and special character processing, etc., and the tabular knowledge that meets the specification through preprocessing is obtained. Then, a large number of SQL statements related to the given candidate table is generated through the SQL sampler. The specific generation process is as follows: one or more SQL templates may be pre-set in the SQL sampler, for example, one of the SQL templates is: SELECT A, WHERE B. Further, A and B in this SQL template are respectively replaced by the fields from the given candidate table. Because there are many fields in the candidate table, for example, column name, column value, etc., A may be replaced with one field in the candidate table and B replaced with another field in the candidate table, so as to obtain a plurality of instantiated SQL statements. Furthermore, the fields that A and B are replaced with respectively may also be updated, so as to obtain another set of instantiated SQL statements. By analogy, many instantiated SQL statements corresponding to the given candidate table may be obtained. In summary, SQL statements are obtained according to the SQL template and a certain candidate table, and different SQL statements are obtained based on different candidate tables. Finally, each SQL statement is converted into the corresponding natural language, for example, one SQL statement corresponds to one natural language. In order to improve the generalization of script and the fluency of generated script, some words in the natural language converted by each SQL statement may be replaced by synonyms or synonymous phrases of these words, so that one SQL statement may correspond to multiple natural languages, thus increasing the diversity and quantity of training data and reducing the difficulty of obtaining the training data. For example, a certain SQL statement is converted into the corresponding natural language "an annualized yield of 3.5%". Since "an annualized yield" and "a yield" are synonyms, there may be two natural languages corresponding to this SQL statement, one of which is "an annualized yield of 3.5%" and the other of which is "a yield 3.5%". Further, according to the SQL statement and its corresponding two natural languages, two sets of data pairs <Text. SQL> may be obtained, where the Text in one set of data pairs <Text, SQL> is "an annualized yield of 3.5%", the Text in the other data pair <Text, SQL> is "a yield of 3.5%", and the SQL in the two data pairs <Text, SQL> is the same SQL statement. Because there are many SQL statements related to the given candidate table and one of the SQL statements may correspond to one or more natural language statements in Text, a large number of data pairs <Text. SQL> may be obtained.

At present, the basic paradigm of tasks in the field of natural language processing is pre-training+fine tuning, that is, taking a pre-trained model (such as a BERT model) as the foundation model, and further performing fine tuning on the foundation model by using the annotation data of specific tasks, that is, the data obtained according to a certain or several given tabular knowledge pairs <Text. SQL>, that is, fine tuning the parameters of the foundation model. In this embodiment, a pre-trained table model is selected as the foundation model instead of a pre-trained language model, because the pre-trained language model has two shortcomings: (1) the pre-trained language model does not combine text data with tabular knowledge: (2) the pre-trained language model mainly studies language knowledge (e.g., whether a statement is fluent, whether the grammar is correct), but lacks the modeling of structured knowledge. As such, in this case, the pre-trained table model specialized for tabular knowledge is used as the foundation model.

Figure 4:
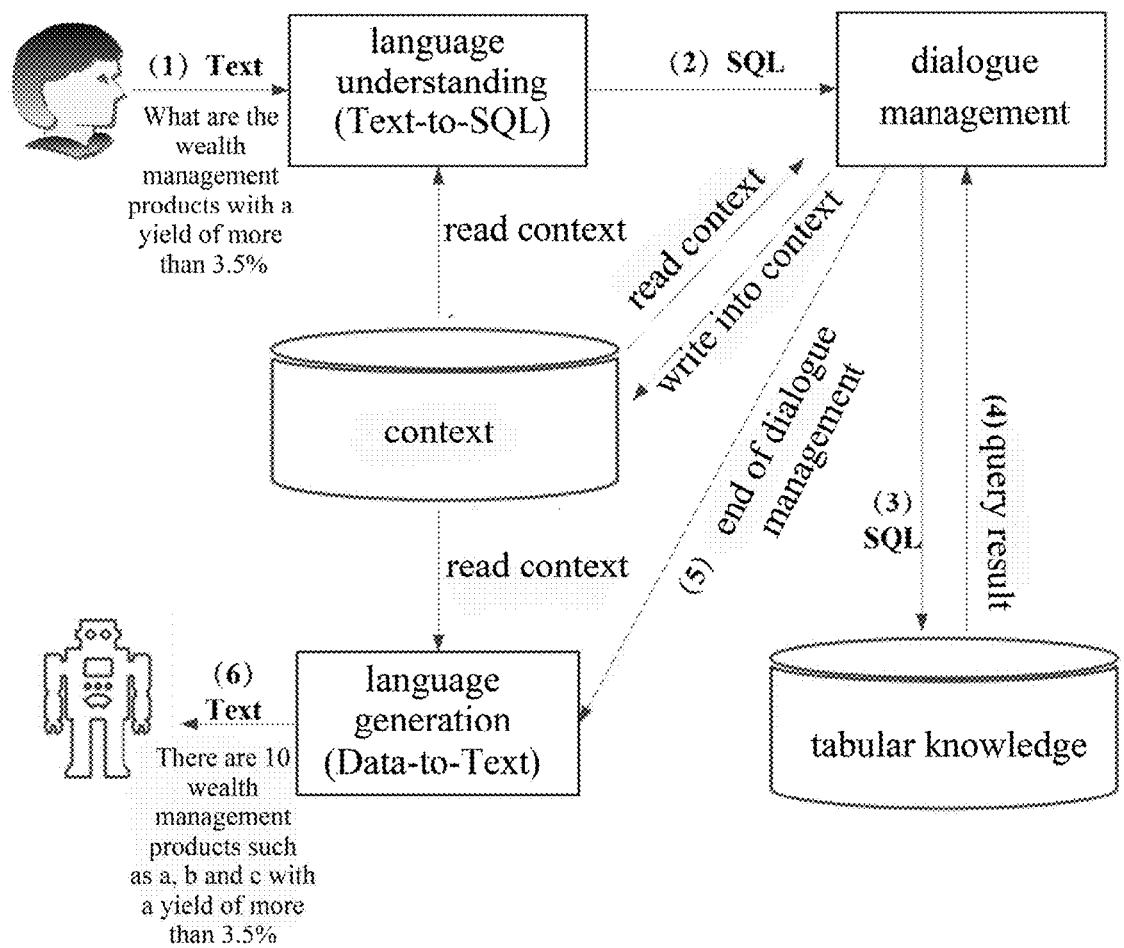
FIG. 4 is a workflow of a core engine of a human-computer dialogue interaction system based on tabular knowledge provided by an embodiment of the present disclosure.

The workflow of a core engine of a human-computer dialogue interaction system based on tabular knowledge is as shown in FIG. 4. First, a user uses natural language to ask a question, for example, the user inputs the question in Text "what are the wealth management products with a yield of more than 3.5%?". After receiving the user statement in Text, the language understanding apparatus 231 first selects the table satisfying the user's question in Text from all candidate tables (which may be one or more, stored in the table library 212) and marks the table satisfying the user's question in Text as a target table. For example, there are three tables in the table library 212 by default, namely, the fund table, the securities table, and the foreign exchange table. The contents in each table are different, and the table that best meets the user's question in Text may be one or more of the three tables. There are several optional methods in the process of selecting the target table from the candidate tables. One of the methods is to select a keyword in the user's question in Text, match the keyword with the description information of each table, and select one or more tables whose matching degree reaches a threshold value as a target table. The other of the methods is to select through a pre-trained model. For example, the input of this model is a user question in Text. and the output of this model is the matching degree between the user's question in Text and each candidate table, and further, one or more candidate tables with matching degree reaching a threshold value are taken as target tables. Then, the target tables and the user's question in Text are used as the inputs of the Text-to-SQL model, and the Text-to-SQL model outputs the SQL statement corresponding to the user's question text (that is, a first query statement), which is, for example. "SELECT product name WHERE yield=3.5%". Then, the dialogue management apparatus 232 acquires the processing result of the language understanding apparatus 231 (i.e., the SQL statement obtained by the language understanding apparatus 231, that is, the SQL shown in (2) in FIG. 4). The dialogue management apparatus 232 may proactively acquire the processing result from the language understanding apparatus 231, or the dialogue management apparatus 232 may passively receive the processing result sent by the language understanding apparatus 231. Further, the dialogue management apparatus 232 continues to process the processing result. In other words, the dialogue management apparatus 232 modifies the first query statement to obtain a second query statement (i.e., the SQL shown in (3) in FIG. 4). For the modification process, please refer to the above description. The SQL shown in (3) in FIG. 4 is different from that shown in (2): the SQL shown in (2) is an SQL statement obtained by the language understanding apparatus 231 according to the user's current question in Text, for example. "what are the wealth management products with a yield of more than 3.5%", but the SQL shown in (3) is an SQL statement obtained after modifying the SQL shown in (2). The SQL shown in (3) is the final and more complete SQL statement. The dialogue management apparatus 232 sends the generated modified SQL, that is, the SQL shown in (3), to a tabular knowledge library (that is, the one or more target tables selected by the language understanding apparatus 231 from the candidate tables) for knowledge query to obtain a query result (the data queried from the target tables). The dialogue management apparatus 232 further sends the modified SQL, that is, the SQL shown in (3) in FIG. 4 and the query result (the query result corresponds to the dialogue management result (5) shown in FIG. 4) to the language generating apparatus 233. Finally, based on the modified SQL, the query result and the user's current question in Text (the language generating apparatus 233 extracts the user's current question in Text from the context database in FIG. 4), the language generating apparatus 233 generates a reply script that "there are 10 wealth management products such as a and b with a yield of more than 3.5%" and replies to it to the user. At this moment, the online process completes a complete round of interaction. It may be understood that the language understanding apparatus, the dialogue management apparatus, the storage space for storing context, the language generating apparatus and the storage space for storing tabular knowledge in FIG. 4 may be deployed on the same server, or they may be deployed on different servers. If they are deployed on a plurality of different servers, the plurality of different servers may form a server cluster. The meaning of writing context into the context database by the dialogue management apparatus in FIG. 4 is to write the user's current question in Text, the modified SQL statement corresponding to the user's current question in Text and the system state corresponding to a current round of dialogue into the context database to provide reference data for the next round of dialogue.

In summary, in the scene where a user conducts a human-computer dialogue based on a terminal, in the process of determining a system reply according to the user's question, the terminal needs three apparatuses in the core engine part 230 of the human-computer conversation interactive system based on tabular knowledge shown in FIG. 2, namely, a language understanding apparatus 231, a conversation management apparatus 232 and a language generation apparatus 233. The core engine part 230 may be deployed locally at the terminal, or it may also be deployed on a remote server that can communicate with the terminal, or some apparatuses in the core engine part 230 are deployed locally at the terminal and some apparatuses are deployed on a remote server. In the case that three apparatuses or some apparatuses in the core engine part 230 are deployed on a remote server, the three apparatuses or some apparatuses may be deployed on the same remote server or on different remote servers. In addition, for the same apparatus in the core engine part 230, the apparatus may also be deployed on a plurality of remote servers, and the corresponding functions of the apparatus may be realized by the plurality of remote servers. In addition, the language understanding apparatus 231 in the core engine part 230 shown in FIG. 2 is specifically a Text-to-SQL model. The role of the data and knowledge part 210 and the pre-trained model part 220 as shown in FIG. 2 is to train the Text-to-SQL model. The role of the data and knowledge part 210 is to provide training data, namely, training sample data. The role of the pre-trained model part 220 is to provide a pre-trained table model, which may serve as a foundation model, and the foundation model is obtained by training in advance using extensive, massive and various types of table data. The training sample data provided by the data and knowledge part 210 is generated according to a certain type of tabular data, such as tabular data about vehicle information. This foundation model is trained by the training sample data provided by the data and knowledge part 210 to obtain a Text-to-SQL model. It may be understood that a Text-to-SQL model may be directly trained from the training sample data provided by the data and knowledge part 210 without a foundation model, but in this case, it corresponds to that the Text-to-SQL model does not have the corresponding foundation model, and the parameters of the Text-to-SQL model need to be optimized from 0, which leads to a long training period. As such, the data and knowledge part 210 and the pre-trained model part 220 may be deployed on a remote server. For example, the data and knowledge part 210 and the pre-trained model part 220 may be deployed on the same or different remote servers. After being trained in a remote server, the Text-to-SQL model may be transplanted to a terminal, which implements functions related to language understanding. Alternatively, after being trained in one certain remote server, the Text-to-SQL model may be transplanted to another remote server, which implements functions related to language understanding.

Further, the human-computer conversation method will be introduced by taking a terminal as an example. The terminal includes but is not limited to a smart phone, a handheld computer, a tablet computer, a wearable device with a display screen, a desktop computer, a notebook computer, an all-in-one computer, a smart home device and the like. As shown in FIG. 1, the specific steps of this method are as follows:

Step S101, acquiring a user statement for a current round.

The user statement is proactively input by the user, and it is usually the user's question. For example, the user statement is "what are the wealth management products with a yield of more than 3.5%". The way in which the user inputs the user statement may be through voice, text or gestures.

Usually, the user statement input by the user and the reply given by the system to the user statement are determined as a round of human-computer dialogue. The user statement for a current round refers to the current user question. In other words, the user statement for a current round refers to the latest user question from the current moment.

Specifically, a user inputs a user statement through a terminal, and the language understanding apparatus 231 in the human-computer dialogue interactive system based on tabular knowledge acquires the user statement.

Step S102, determining, from one or more candidate tables, one or more target tables that match the user statement.

Specifically, after acquiring the user statement, the language understanding apparatus 231 first determines, from one or more candidate tables, one or more target tables that match the user statement. The one or more candidate tables are stored in the table library 212 in FIG. 2. For example, there are three tables in the table library 212 by default, namely, a fund table, a securities table and a foreign exchange table. The contents in each table are different, and the table that best meets the user statement may be one or more of the three tables.

The step of determining, from one or more candidate tables, one or more target tables that match the user statement includes:

determining a keyword in the user statement, matching the keyword with the description information of each candidate table, and taking one or more tables whose matching degree reaches a threshold value as the target tables. Alternatively, selecting the target tables by using a pre-trained model, specifically, inputting the user statement into the pre-trained model, and obtaining the matching degree between the user statement and each candidate table, and taking one or more candidate tables whose matching degree reaches a threshold value as the target tables.

Step S103, parsing the user statement for the current round to obtain a first query statement.

Optionally, parsing the user statement for the current round to obtain the first query statement includes: taking the one or more target tables and the user statement for the current round as inputs of a preset model to obtain the first query statement through the preset model. The preset model may be the above-mentioned Text-to-SQL model.

For example, if the user statement is "what are the wealth management products with a yield of more than 3.5%?", the corresponding first query statement is "SELECT product name WHERE yield=3.5%".

Further, the user statement in the current round may also be parsed by way of converting natural language into SQL, which is widely used at present, to obtain the first query statement.

Step S104, querying from the one or more target tables according to the first query statement to obtain target data.

Optionally, after obtaining the first query statement through the language understanding apparatus 231, the language understanding apparatus 231 sends the first query statement to the dialogue management apparatus 232, or the dialogue management apparatus 232 proactively requests the first query statement from the language understanding apparatus 231. Further, the dialogue management apparatus 232 modifies the first query statement to obtain a second query statement and queries from the one or more target tables according to the second query statement to obtain target data. Further, the target data and the second query statement are provided to the language generation apparatus 233.

Further, when acquiring the first query statement, the dialogue management apparatus 232 may also query from the one or more target tables according to the first query statement to obtain target data. Further, the target data and the second query statement are provided to the language generation apparatus 233. It may be understood that the more information dimensions are referenced, the more accurate the target data obtained from the target tables is, and the more it meets the user's demand.

Step S104, generating a system reply for the current round according to the target data.

In some implementations, the language generating apparatus 233 generates a system reply based on the target data and the user statement for the current round (the language generating apparatus 233 extracts the user statement from the context database in FIG. 4), e.g., "there are 10 wealth management products such as a and b with a yield of more than 3.5%", and replies it to the user, the way of which may be playing it to the user by voice or displaying it on the display screen of the terminal.

In other implementations, the language generating apparatus 233 generates a system reply based on the target data, the current user statement and the second query statement (the language generating apparatus 233 extracts the user statement from the context database in FIG. 4), and replies to it to the user. By referring to more relevant information, the generated system reply may be smoother and more readable.

In the embodiments of the present disclosure, when acquiring a user statement for a current round, one or more target tables that match the user statement are determined from one or more candidate tables. Then, it is queried from the one or more target tables according to a first query statement corresponding to the user statement to obtain target data. Finally, a system reply for the current round to the user statement is generated according to the target data.

In this way, the purpose of providing a system reply to the user based on tabular knowledge is achieved.

Figure 5:
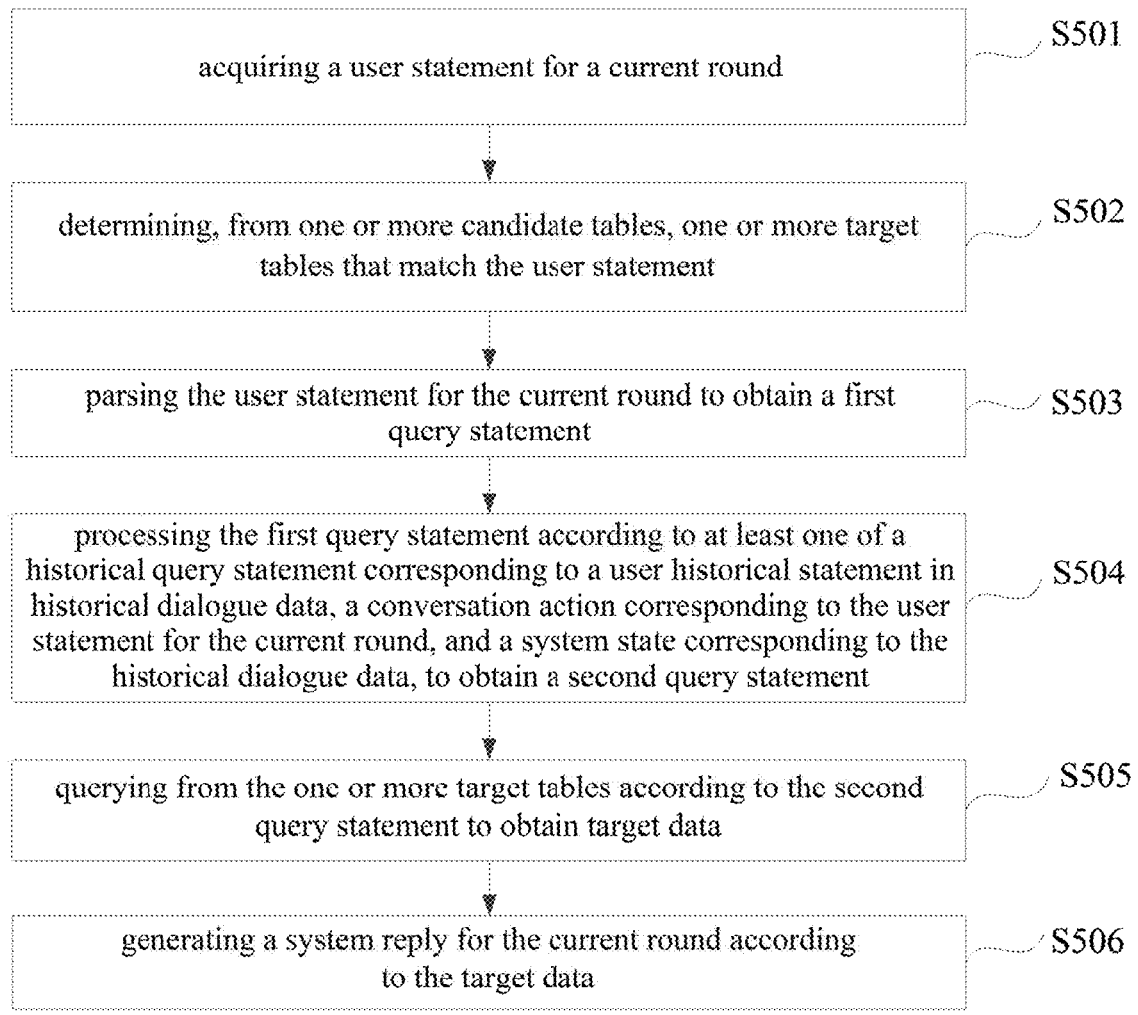
FIG. 5 is a flowchart of a human-computer dialogue method provided by another embodiment of the present disclosure.

FIG. 5 is a flowchart of a human-computer dialogue method provided by another embodiment of the present disclosure. In this embodiment, one optional implementation is given for the above step S104. As shown in FIG. 5, the specific steps of this method are as follows:

Step S501, acquiring a user statement for a current round.

Step S502, determining, from one or more candidate tables, one or more target tables that match the user statement.

Step S503, parsing the user statement for the current round to obtain a first query statement.

Step S504, processing the first query statement according to at least one of a historical query statement corresponding to a user historical statement in historical dialogue data, a conversation action corresponding to the user statement for the current round, and a system state corresponding to the historical dialogue data, to obtain a second query statement.

The conversation action is obtained according to the historical query statement and the first query statement, the system state corresponding to the historical dialogue data is used to characterize whether the historical system reply in the historical dialogue data is a query statement.

Historical dialogue data refers to the historical dialogue records between the user and the system. Historical dialogue data includes one or more rounds of human-computer dialogue. The user statement in each round of human-computer dialogue is a historical user statement, and each historical user statement corresponds to a historical query statement, i.e., an SQL statement.

Specifically, after acquiring the first query statement, the dialogue management apparatus 232 modifies the first query statement according to at least one of the three factors described below to obtain the second query statement corresponding to the user statement for the current round. The three factors are specifically a historical query statement corresponding to the user historical statement in historical dialogue data, a conversation action corresponding to the user statement for the current round and a system state correspond to the historical dialogue data. The historical query statement corresponding to the user historical statement in historical dialogue data refers to the modified SQL statement corresponding to the user statement in the previous round of dialogue before the current round of dialogue (that is, the second query statement in the previous round of dialogue), and this historical query statement is stored in the "context" database as shown in FIG. 4. The conversation action corresponding to the user statement for the current round is obtained by the dialogue management apparatus 232 according to the second query statement in the previous round of dialogue and the first query statement in the current round of dialogue. That is, the conversation action is obtained according to the historical query statement and the first query statement. The "system state corresponding to the historical dialogue data" refers to whether the system directly replied to the dialogue with a script or asked the user a query question in the previous round of dialogue. The "system state corresponding to the historical conversation data" is also stored in the "context" database shown in FIG. 4. A question from a user and a reply given by the system to the question serve as a round of dialogue. "Conversation actions" include adding a query condition, deleting a query condition and modifying a query condition. Specifically, an example of adding a query condition is as follows: the user inputs a first statement: "what are the wealth management products with a yield of more than 3.5%?", and after the system replies to the first statement, the user then inputs a second statement: "what about the wealth management products with guaranteed capital". In this scenario, the second statement input by the user actually involved adding a query condition on the basis of the first statement, that is, the complete information corresponding to the second statement is "what are the wealth management products with a yield of more than 3.5% and guaranteed capital", that is, adding the query condition "with guaranteed capital" on the basis of the query condition "with a yield of more than 3.5%". An example of deleting a query condition is as follows: the user inputs a first statement: "what are the wealth management products with guaranteed capital and a yield of more than 3.5%?", after the system replies to the first statement, the user inputs a second statement: "what about the wealth management products with a yield of more than 3.5%". In this scenario, the user's second statement actually involves deleting a query condition on the basis of the first statement, that is, the complete information corresponding to the second statement is "what are the wealth management products with a yield of more than 3.5%". An example of modifying a query condition is as follows: the user inputs a first statement: "does the car of a certain brand have a skylight". After the system replies to the first statement, the user enters a second question, "what is the performance of the off-road vehicle of the certain brand". In this scenario, the query condition corresponding to the user's second statement is different from the query condition corresponding to the first statement, and it is a scenario of modifying query conditions. The process of modifying the first query statement to obtain the second query statement corresponding to the current question is further exemplified as follows.

The user statement: does a car of Sun brand have a skylight? (This statement is the user historical statement).

The system replies: the car of Sun brand has a skylight. (One question asked by the user and the targeted reply given by the system constitute a round of dialogue).

The user further asks: what about its acceleration of 100 kilometers? (This statement is the user statement for a current round).

The SQL statement corresponding to the question "does a car of Sun brand have a skylight?" is, for example, "SELECT skylight WHERE car of Sun brand". The SQL statement (that is, the first query statement) corresponding to the user statement for the current round "what about its acceleration of 100 kilometers?" is "SELECT acceleration of 100 kilometers". The second query statement in the current round of dialogue obtained after modifying the first query statement is "SELECT acceleration of 100 kilometers WHERE car of Sun brand". The second query statement obtained by modifying the first query statement is more compatible with the user's query intention, that is, it can better reflect the user's query intention, thus making the target data obtained based on the second query statement more accurate, making the final system reply more targeted, and achieving the technical effect that that what is answered is what is asked.

Step S505, querying from the one or more target tables according to the second query statement to obtain the target data.

Further, the dialogue management apparatus 232 performs data query in the target tables according to the second query statement, records the queried data as target data, and provides the target data to the language generation apparatus 233.

Step S506, generating the system reply for the current round according to the target data.

The language generation apparatus 233 generates a system reply for the current round according to the target data and the user statement for the current round. For example, if the user statement for the current round is whether the car of Sun brand have a skylight, and the target data is Y, where Y represents the presence of a skylight, the language generation apparatus 233 generates the system reply for the current round as: the car of Sun brand has a skylight according to the target data and the user statement for the current round.

Specifically, the implementation method and specific principle of steps S501-S503 are the same as those of steps S101-S103, which will not be repeated in detail here.

This embodiment provides an optional implementation for the above step S104. Specifically, in the process of querying from the one or more target tables according to the second query statement to obtain target data, the first query statement is firstly processed according to at least one of a historical query statement corresponding to a user historical statement in historical dialogue data, a conversation action corresponding to the user statement for the current round and a system state corresponding to the historical dialogue data, to obtain a second query statement. Then, it is queried from the one or more target tables according to the second query statement to obtain target data. This improves the query accuracy of target data, so that the effect of providing the user with a system reply based on tabular knowledge is better.

Figure 6:
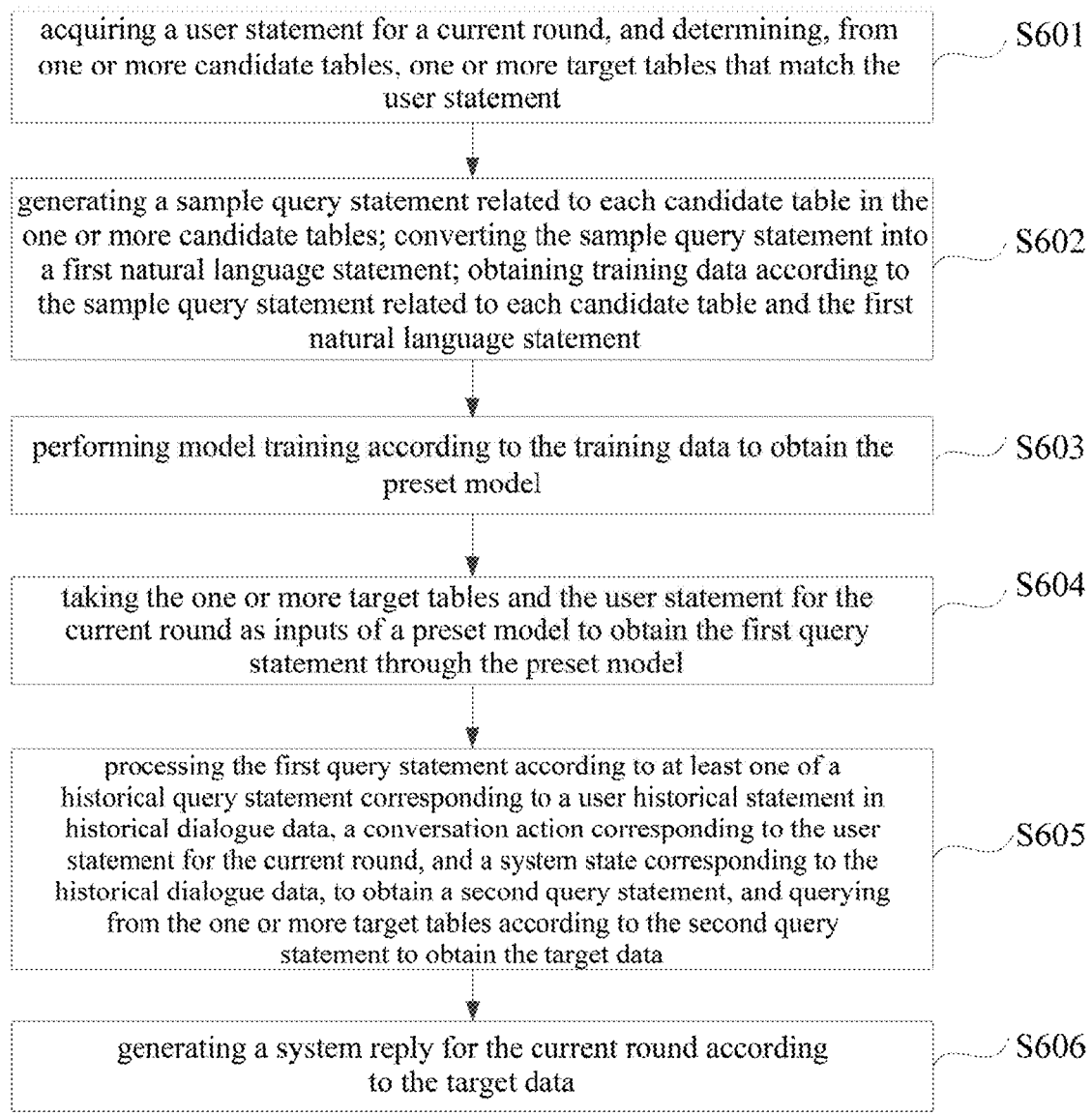
FIG. 6 is a flowchart of a human-computer dialogue method provided by another embodiment of the present disclosure.

FIG. 6 is a flowchart of a human-computer dialogue method provided by another embodiment of the present disclosure. In this embodiment, the step of acquiring a preset model is added. As shown in FIG. 6, the specific steps of this method are as follows:

Step S601, acquiring a user statement for a current round, and determining, from one or more candidate tables, one or more target tables that match the user statement.

Step S602, generating a sample query statement related to each candidate table in the one or more candidate tables: converting the sample query statement into a first natural language statement: obtaining training data according to the sample query statement related to each candidate table and the first natural language statement.

Specifically, a large number of SQL statements related to each candidate table, that is, sample query statements, may be generated by an SQL sampler. The specific generation process is as follows: one or more SQL templates may be pre-set in the SQL sampler, for example, one of the SQL templates is: SELECT A, WHERE B. Further, A and B in this SQL template are respectively replaced by the fields from the candidate table. Because there are many fields in the candidate table, for example, column name, column value, etc., A may be replaced with one field in the candidate table and B replaced with another field in the candidate table, so as to obtain multiple instantiated SQL statements. Furthermore, the fields that A and B are replaced with respectively may also be updated, so as to obtain another set of instantiated SQL statements. By analogy, many instantiated SQL statements corresponding to each candidate table may be obtained. In summary, sample query statements are obtained according to the SQL template and a certain candidate table, and different sample query statements are obtained based on different candidate tables. Finally, each sample query statement is converted into a corresponding first natural language statement. For example, one sample query statement corresponds to one natural language statement. In order to improve the generalization of script and the fluency of generated script, some words in the first natural language statement converted by each sample query statement may be replaced by synonyms or synonymous phrases of these words, so that one sample query statement may correspond to multiple natural language statements, thus increasing the diversity and quantity of training data and reducing the difficulty of obtaining the training data. For example, a certain sample query statement is converted into the corresponding natural language "an annualized yield of 3.5%". Since "an annualized yield" and "a yield" are synonyms, there may be two natural language statements corresponding to this sample query statement, one of which is "an annualized yield of 3.5%" and the other of which is "a yield 3.5%". Further, according to the sample query statement and its corresponding two natural languages, two sets of data pairs <Text, SQL> may be obtained, where the Text in one set of data pairs <Text, SQL> is "an annualized yield of 3.5%", the Text in the other data pair <Text, SQL> is "a yield of 3.5%", and the SQL in the two data pairs <Text, SQL> is the same sample query statement. Because there are many sample query statements related to the given candidate table and one of the sample query statements may correspond to one or more natural language statements in Text, a large number of data pairs <Text, SQL> may be obtained and determined as training data.

In summary, obtaining the training data according to the sample query statement related to each candidate table and the first natural language statement includes: replacing a keyword in the first natural language statement with a synonym or a synonymous phrase corresponding to the keyword to obtain one or more second natural language statements corresponding to the sample query statement: and obtaining the training data according to the sample query statement related to each candidate table, the first natural language statement and the one or more second natural language statements.

Step S603, performing model training according to the training data to obtain the preset model.

Optionally, a pre-trained model is trained according to the training data to obtain a preset model, where the pre-trained model is a model trained in advance according to table information.

At present, the basic paradigm of tasks in the field of natural language processing is pre-training+fine tuning, that is, taking a pre-trained model (such as a BERT model) as the foundation model, and further performing fine tuning on the foundation model by using the annotation data of specific tasks, that is, the data obtained according to a certain or several given tabular knowledge pairs <Text, SQL>, that is, fine tuning the parameters of the foundation model. In this embodiment, a pre-trained table model is selected as the foundation model instead of a pre-trained language model, because the pre-trained language model has two shortcomings: (1) the pre-trained language model does not combine text data with tabular knowledge: (2) the pre-trained language model mainly studies language knowledge (e.g., whether a statement is fluent, whether the grammar is correct), but lacks the modeling of structured knowledge. As such, in this case, the pre-trained table model specialized for tabular knowledge is used as the foundation model. It may be understood that the preset model may be directly trained from the training data without a foundation model, but in this case, it corresponds to that the preset model does not have the corresponding foundation model, and the parameters of the preset model need to be optimized from 0, which leads to a long training period.

Step S604, taking the one or more target tables and the user statement for the current round as inputs of a preset model to obtain the first query statement through the preset model.

Step S605, processing the first query statement according to at least one of a historical query statement corresponding to a user historical statement in historical dialogue data, a conversation action corresponding to the user statement for the current round, and a system state corresponding to the historical dialogue data, to obtain a second query statement, and querying from the one or more target tables according to the second query statement to obtain the target data.

Step S606, generating the system reply for the current round according to the target data.

In this embodiment, the step of acquiring a preset model is added. Specifically, a sample query statement related to each candidate table in the one or more candidate tables is generated first, and the sample query statement is converted into a first natural language statement. Training data is obtained according to the sample query statement related to each candidate table and the first natural language. Then, a pre-trained model is trained according to the training data to obtain a preset model, where the pre-trained model is a model trained in advance according to table information. Some words in the first natural language statement converted by each sample query statement may be replaced by synonyms or synonymous phrases of these words, so that one sample query statement may correspond to multiple natural language statements, thus increasing the diversity and quantity of training data, reducing the acquiring difficulty of training data and realizing the automatic generation of training data. By using a pre-trained model as the foundation model, the training period of the preset model is shortened, and the model performance and effect of the preset model are improved. By using the pre-trained table model specialized for tabular knowledge as the foundation model, the purpose of providing users with system replies based on tabular knowledge is achieved.

Figure 7:
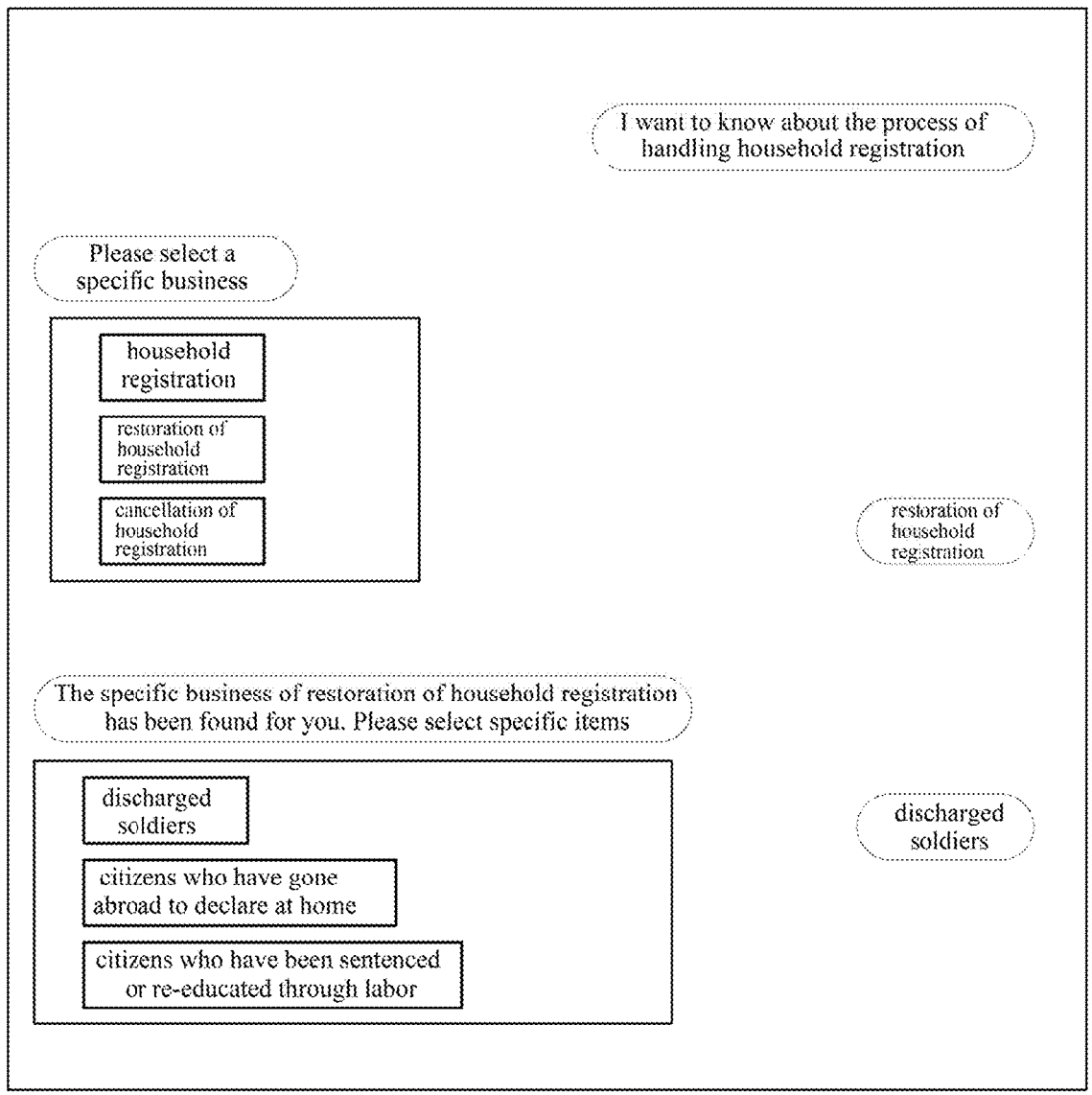
FIG. 7 is a schematic diagram of an interactive interface for human-computer dialogue provided by another embodiment of the present disclosure.

On the basis of the above-described embodiments, refer to the schematic diagram of the interactive interface for a human-computer dialogue in a specific application scenario as shown in FIG. 7, in which the message on the left is the system reply given by the system and the message on the right is the user statement. In the actual business scenario, the actual user problem may be solved through a plurality of rounds of dialogue. Examples are as follows.

User statement: I want to know about the process of handling household registration.

System reply: Please select specific business: account registration, restoration of household registration and cancellation of household registration.

User statement: Restoration of household registration.

System reply: The specific business of restoration of household registration has been found for you. Please select specific items: discharged soldiers, citizens who have gone abroad to declare at home, citizens who have been sentenced or re-educated through labor.

User statement: Discharged soldiers.

When the system replies to the second statement of the user, it combines the first reply of the system with the second statement of the user, that is, the second reply of the system to the user is determined based on the dialogue history.

Figure 8:
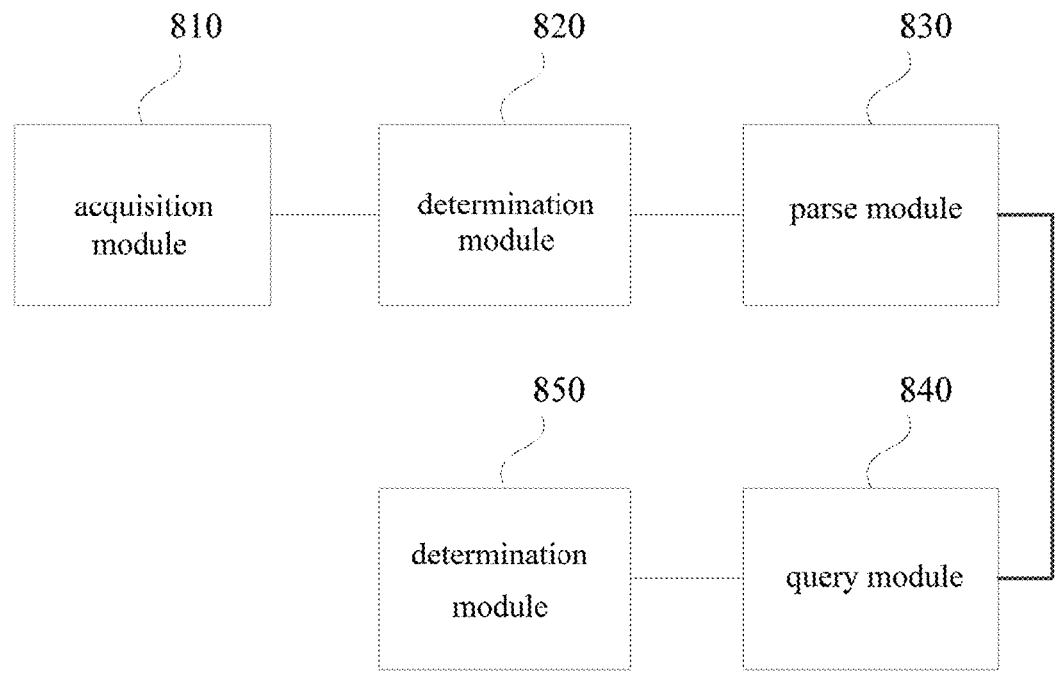
FIG. 8 is a schematic structural diagram of a human-computer dialogue apparatus provided by an embodiment of the present disclosure.

FIG. 8 is a schematic structural diagram of a human-computer dialogue apparatus provided by an embodiment of the present disclosure. The human-computer dialogue device provided by the embodiment of the present disclosure may execute the processing flow provided by the embodiment of the human-computer dialogue method. As shown in FIG. 8, the human-computer dialogue apparatus 80 includes an acquisition module 810, a determination module 820, a parse module 830, a query module 840 and a generation module 850.

The acquisition module 810 is configured for acquiring a user statement for a current round: the determination module 820 is configured for determining, from one or more candidate tables, one or more target tables that match the user statement: the parse module 830 is configured for parsing the user statement for the current round to obtain a first query statement: the query module 840 is configured for querying from the one or more target tables according to the first query statement to obtain target data: and the generation module 850 is configured for generating a system reply for the current round according to the target data.

Optionally, the query module 840 includes: a processing unit configured for processing the first query statement according to at least one of a historical query statement corresponding to a user historical statement in historical dialogue data, a conversation action corresponding to the user statement for the current round and a system state corresponding to the historical dialogue data, to obtain a second query statement: and a query unit configured for querying from the one or more target tables according to the second query statement to obtain target data. The conversation action is obtained according to the historical query statement and the first query statement, the system state corresponding to the historical dialogue data is used to characterize whether a historical system reply in the historical dialogue data is a query statement.

Optionally, the generation module 850 is specifically configured for generating a system reply for the current round according to the target data.

Optionally, the parse module 830 is specifically configured for taking the one or more target tables and the user statement for the current round as inputs of a preset model and obtaining the first query statement through the preset model.

Optionally, the human-computer dialogue apparatus 80 further includes: a training data generation module configured for generating a sample query statement related to each candidate table in the one or more candidate tables before taking the one or more target tables and the user statement for the current round as inputs of the preset model to obtain the first query statement through the preset model: converting the sample query statement into a first natural language statement: obtaining training data according to the sample query statement related to each candidate table and the first natural language statement: and a training module configured for performing model training according to the training data to obtain the preset model.

Optionally, the training module is specifically used for training a pre-trained model according to the training data to obtain the preset model, the pre-trained model being a model trained in advance according to table information.

Optionally, the training data generation module includes: a replacement unit configured for replacing a keyword in the first natural language statement with a synonym or a synonymous phrase corresponding to the keyword to obtain one or more second natural language statements corresponding to the sample query statement: and obtaining the training data according to the sample query statement related to each candidate table, the first natural language statement and the one or more second natural language statements.

The human-computer dialogue apparatus shown in FIG. 8 may be used to execute the technical solution of the embodiment of the above method. The implementation principle and technical effect are similar, which will not be repeated in detail here.

Figure 9:
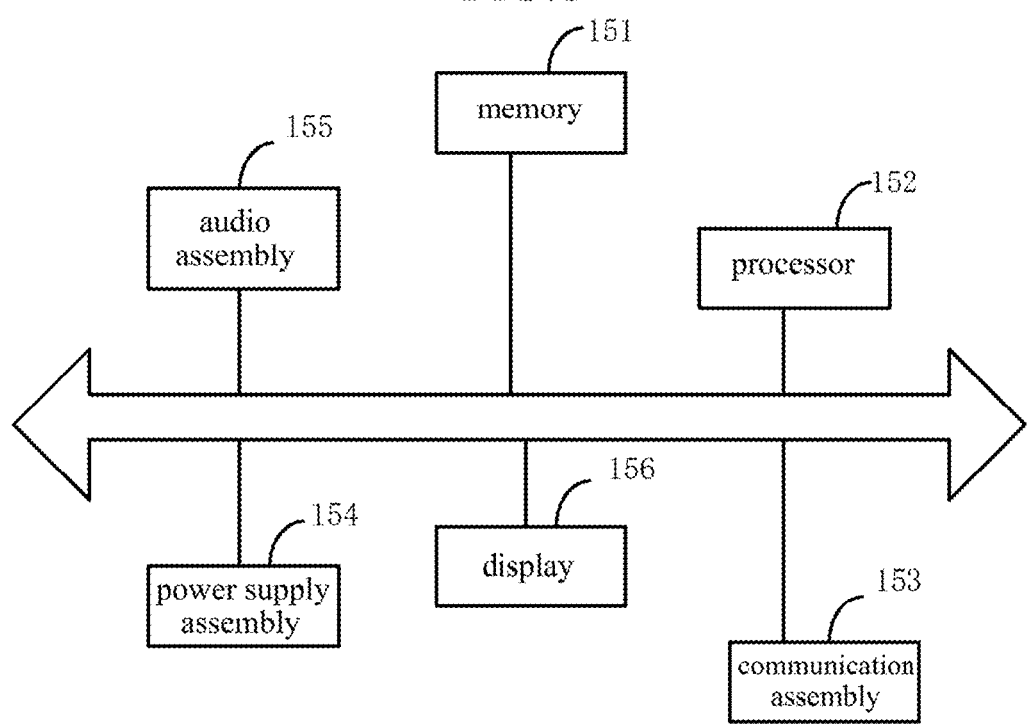
FIG. 9 is a schematic structural diagram of an electronic device embodiment provided by an embodiment of the present disclosure.

The internal function and structure of the human-computer dialogue apparatus have been described above. The apparatus may be realized as an electronic device. FIG. 9 is a schematic structural diagram of an electronic device embodiment provided by an embodiment of the present disclosure. As shown in FIG. 9, the electronic device includes a memory 151 and a processor 152.

The memory 151 is configured for storing a program. In addition to the above program, the memory 151 may also be configured for storing various other data to support operations on the electronic device. Examples of such data include instructions for any application or method operating on the electronic device, contact data, phone book data, messages, pictures, videos, etc.

The memory 151 may be realized by any type of volatile or non-volatile storage device or a combination of them, for example, a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The processor 152, coupled to the memory 151, executes the program stored in the memory 151 for:
  acquiring a user statement for a current round: determining, from one or more candidate tables, one or more target tables that match the user statement: parsing the user statement for the current round to obtain a first query statement: querying from the one or more target tables according to the first query statement to obtain target data: and generating a system reply for the current round according to the target data.

Further, as shown in FIG. 9, the electronic device may also include a communication assembly 153, a power supply assembly 154, an audio assembly 155, a display 156 and other assemblies. Only some assemblies are schematically shown in FIG. 9, which does not mean that the electronic device only includes the assemblies shown in FIG. 9.

The communication assembly 153 is configured to facilitate wired or wireless communication between the electronic devices and other devices. The electronic device may access wireless networks based on communication standards, such as Wi-Fi, 2G or 3G, or a combination thereof. In one exemplary embodiment, the communication assembly 153 receives a broadcast signal or broadcast related information from an external broadcast management system via a broadcast channel. In one exemplary embodiment, the communication assembly 153 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

The power supply assembly 154 provides electrical power for various assemblies of the electronic device. The power supply assembly 154 may include a power supply management system, one or more power supplies, and other assemblies associated with generating, managing, and distributing electrical power for the electronic device.

The audio assembly 155 is configured for outputting and/or inputting an audio signal. For example, the audio assembly 155 includes a microphone (MIC) configured for receiving an external audio signal when the electronic device is in operation modes, such as a call mode, a recording mode and a voice recognition mode. The received audio signal may be further stored in the memory 151 or transmitted via the communication assembly 153. In some embodiments, the audio assembly 155 further includes a speaker for outputting an audio signal.

The display 156 includes a screen, which may include a liquid crystal display (LCD) and a touch panel (TP). If the screen includes a touch panel, the screen may be implemented as a touch screen to receive an input signal from a user. The touch panel includes one or more touch sensors to sense touch, sliding and gestures on the touch panel. The touch sensor may not only sense the boundary of a touch or sliding action, but also detect the duration and pressure related to the touch or sliding operation.

In addition, the embodiment of the present disclosure further provides a computer-readable storage medium, on which a computer program is stored, where the computer program, when executed by a processor, implements the method as described in the above embodiment.

The embodiment of the present disclosure further provides a computer program product, which includes a computer program stored in a readable storage medium, from which at least one processor of an electronic device may read the computer program, and the at least one processor executes the computer program to cause the electronic device to perform the scheme provided by any of the above method embodiments. Specific functions and technical effects that may be achieved are not described in detail here.

By applying the human-computer dialogue method, apparatus, device, and storage medium provided in the embodiments of the present disclosure, when acquiring a user statement for a current round, one or more target tables that match the user statement are determined from one or more candidate tables. Then, it is queried from the one or more target tables according to a first query statement corresponding to the user statement to obtain target data. Finally, a system reply for the current round to the user statement is generated according to the target data. In this way, the purpose of providing a system reply to the user based on tabular knowledge is achieved.

It should be noted that relational terms herein such as "first" and "second" are only used to distinguish one entity or operation from another entity or operation, and do not necessarily require or imply that there is any such actual relationship or order between these entities or operations. Moreover, the terms "comprising", "including", "containing" or any other variation thereof are intended to cover non-exclusive inclusion, so that the process, method, article or device including a series of elements not only includes those elements, but also includes other elements not explicitly listed, or elements inherent to such process, method, article or device. Without more restrictions, the element defined by the phrase "including one (or a/an) . . . " does not exclude that there are other identical elements in the process, method, article, or device including the element.

What has been described above is only the specific embodiments of the present disclosure, so that those skilled in the art can understand or implement the present disclosure. Various modifications to these embodiments will be obvious to those skilled in the art, and the general principles defined herein may be implemented in other embodiments without departing from the spirit or scope of the present disclosure. Accordingly, the present disclosure will not be limited to the embodiments described here but will instead encompass the broadest scope consistent with the principles and novel features disclosed herein.

What is claimed is:

1. A human-computer dialogue method comprising, by one or more computer devices:
   acquiring a user statement for a current round;
   determining, from one or more candidate tables, one or more target tables that match the user statement;
   parsing the user statement for the current round to obtain a first query statement, wherein parsing the user statement further comprising:
      generating a sample query statement related to each candidate table in the one or more candidate tables;
      converting the sample query statement into a first natural language statement;
      obtaining training data according to the sample query statement related to each candidate table and the first natural language statement;
      performing model training according to the training data to obtain the preset model; and
      taking the one or more target tables and the user statement for the current round as inputs of a preset model to obtain the first query statement through the preset model;
   querying from the one or more target tables according to the first query statement to obtain target data, wherein querying from the one or more target tables further comprising:
      processing the first query statement according to a historical query statement corresponding to a user historical statement in historical dialogue data, a conversation action corresponding to the user statement for the current round, and a system state corresponding to the historical dialogue data, to obtain a second query statement; and
      querying from the one or more target tables according to the second query statement to obtain the target data;
   wherein:
      the conversation action is obtained according to the historical query statement and the first query statement, and the conversation action comprises adding a query condition, deleting the query condition and modifying the query condition; and
      the system state corresponding to the historical dialogue data is used to characterize whether a historical system reply in the historical dialogue data is a query statement;
   and
   generating a system reply for the current round according to the target data.

2. The method according to claim 1, wherein generating the system reply for the current round according to the target data comprises: generating the system reply for the current round according to the target data and the user statement for the current round.

3. The method according to claim 1, wherein performing the model training according to the training data comprises: training a pre-trained model according to the training data to obtain the preset model, the pre-trained model being a model trained in advance according to table information.

4. The method according to claim 1, wherein obtaining the training data according to the sample query statement related to each candidate table and the first natural language statement comprises: replacing a keyword in the first natural language statement with a synonym or a synonymous phrase corresponding to the keyword to obtain one or more second natural language statements corresponding to the sample query statement; and obtaining the training data according to the sample query statement related to each candidate table, the first natural language statement and the one or more second natural language statements.

5. An electronic device, comprising:

a memory;

a processor; and a computer program;

wherein the computer program is stored in the memory and configured to be executed by the processor to implement the following steps;

acquiring a user statement for a current round;

determining, from one or more candidate tables, one or more target tables that match the user statement;

parsing the user statement for the current round to obtain a first query statement, wherein parsing the user statement further comprising:

generating a sample query statement related to each candidate table in the one or more candidate tables;

converting the sample query statement into a first natural language statement;

obtaining training data according to the sample query statement related to each candidate table and the first natural language statement;

performing model training according to the training data to obtain the preset model; and taking the one or more target tables and the user statement for the current round as inputs of a preset model to obtain the first query statement through the preset model;

querying from the one or more target tables according to the first query statement to obtain target data, wherein querying from the one or more target tables further comprising:

processing the first query statement according to a historical query statement corresponding to a user historical statement in historical dialogue data, a conversation action corresponding to the user statement for the current round, and a system state corresponding to the historical dialogue data, to obtain a second query statement; and querying from the one or more target tables according to the second query statement to obtain the target data;

wherein:

the conversation action is obtained according to the historical query statement and the first query statement, and the conversation action comprises adding a query condition, deleting the query condition and modifying the query condition; and the system state corresponding to the historical dialogue data is used to characterize whether a historical system reply in the historical dialogue data is a query statement;

and generating a system reply for the current round according to the target data.

6. The electronic device according to claim 5, wherein generating the system reply for the current round according to the target data comprises: generating the system reply for the current round according to the target data and the user statement for the current round.

7. A non-transitory computer-readable storage medium, on which a computer program is stored, wherein the computer program, when executed by a processor, implements the following steps:

acquiring a user statement for a current round;

determining, from one or more candidate tables, one or more target tables that match the user statement;

parsing the user statement for the current round to obtain a first query statement, wherein parsing the user statement further comprising:

generating a sample query statement related to each candidate table in the one or more candidate tables;

converting the sample query statement into a first natural language statement;

obtaining training data according to the sample query statement related to each candidate table and the first natural language statement;

performing model training according to the training data to obtain the preset model; and taking the one or more target tables and the user statement for the current round as inputs of a preset model to obtain the first query statement through the preset model;

querying from the one or more target tables according to the first query statement to obtain target data, wherein querying from the one or more target tables further comprising:

processing the first query statement according to a historical query statement corresponding to a user historical statement in historical dialogue data, a conversation action corresponding to the user statement for the current round, and a system state corresponding to the historical dialogue data, to obtain a second query statement; and querying from the one or more target tables according to the second query statement to obtain the target data;

wherein:

the conversation action is obtained according to the historical query statement and the first query statement, and the conversation action comprises adding a query condition, deleting the query condition and modifying the query condition; and the system state corresponding to the historical dialogue data is used to characterize whether a historical system reply in the historical dialogue data is a query statement;

and generating a system reply for the current round according to the target data.

* * * * *